(No Model.)

W. JOHNSTON.
NECK YOKE.

No. 599,391.　　　　　　Patented Feb. 22, 1898.

WITNESSES　　　　　　　　INVENTOR
A. B. Driggs　　　　　　　William Johnston
A. R. Brown　　　　　　　By Chas. J. Gooch
　　　　　　　　　　　　　　　his Attorney

THE NORRIS PETERS CO., PHOTO-LITHO., WASHINGTON, D. C.

UNITED STATES PATENT OFFICE.

WILLIAM JOHNSTON, OF ELLSWORTH, WISCONSIN.

NECK-YOKE.

SPECIFICATION forming part of Letters Patent No. 599,391, dated February 22, 1898.

Application filed June 5, 1897. Serial No. 639,561. (No model.)

*To all whom it may concern:*

Be it known that I, WILLIAM JOHNSTON, a citizen of the United States, residing at Ellsworth, in the county of Pierce and State of Wisconsin, have invented certain new and useful Improvements in Neck-Yokes; and I do hereby declare the following to be a full, clear, and exact description of the invention, such as will enable others skilled in the art to which it appertains to make and use the same.

This invention relates to improvements, as hereinafter set forth, in neck-yokes.

Figure 1:
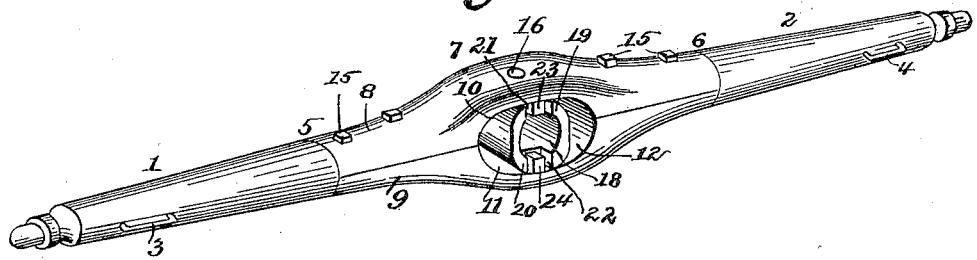
Figure 2:
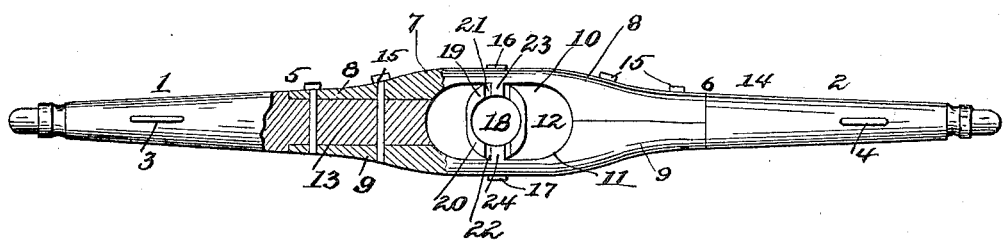

In the drawings, Figure 1 represents a perspective view of a neck-yoke constructed according to my invention. Fig. 2 represents a side elevation thereof, partly broken away.

The object of my invention is to produce a sectional neck-yoke which is provided with a pole-support automatically adjustable to the unequal movements of horses and is of sufficient strength and of a construction to prevent injury to or breakage of the connection in use.

1 2 represent the respective ends of the yoke-bar, which ends are provided with collar-strap-connecting loops 3 4. The inner ends of the end sections 1 2 are shouldered at 5 6 to afford seat-bearings for the outer ends of a sectional central connecting-bar or coupling 7, of malleable metal. This coupling or connecting-bar is formed in two sections 8 9, each having a concaved central portion 10 11, of arc shape, so as, when said sections 8 9 are in position, to constitute a curved elongated eye 12, the respective ends of said sections being also concaved in their inner faces to receive the cylindrical inner ends 13 14 of the end sections of the yoke-bar, suitable registering slots or holes being formed in the respective ends of said central coupling and the inner ends of the sections 1 2, respectively, to receive bolts, pins, or other connecting devices 15 by which the respective sections are removably connected together.

16 17 represent dowels, pins, or studs projecting inwardly from the respective inner faces of the elongated eyed central portion to receive and afford oscillating pivotal top and bottom bearing for the automatically-adjustable pole receiving and supporting socket 18, which is of substantially cylindrical construction, though it may be of elongated form, as shown, and has thickened upper and lower portions 19 20, on which the wear comes. In one end of this pole-receiving socket 18 are formed upper and lower recesses 21 22 to receive lugs or projections 23 24, extending inwardly from the central eyed portion 12, said recesses 21 22 being of greater width than said lugs 23 24 to admit of the free oscillation, within certain limits, of said pole-supporting socket, said lugs 23 24 serving as stops to limit the oscillatory movements of the pole receiving and supporting socket, as either or both of the horses may pull in advance of the other at times. This construction admits of the pole being firmly supported in position and the unequal movements of either horse being taken up by said socket without interfering with the other horse. Where rigid pole-supports are employed, no such adjustment whereby one horse is unaffected by the unequal pull of the other horse is possible. When connection between the horses and the yoke is by means of straps only, said straps soon become worn out and broken by reason of the unequal pulling thereon of the horses. These objectionable features are entirely overcome by my device, which affords a firm bearing-support for the pole, prevents undue strain thereon laterally during uneven pulling of the horses, reduces friction, and forms an easy and flexible connection or coupling, as will be readily understood.

By forming the central coupling-bar in sections and with concaved ends it can be very readily applied to or removed from position and firm and secure connection had between it and the respective ends of the yoke-bar. By forming the eye in the center of said central coupling elongated the lateral or oscillatory movement of the pole-socket is always possible without binding, while by making the upper and lower faces of said pole-socket thicker than the sides it will last longer and be less subject to wear than would be the case were such upper and lower portions not so thickened.

Having thus described my invention, what I claim is—

1. A neck-yoke, consisting of a pair of end bars having shouldered inner ends a metallic connecting-bar formed in two longitudinal sections the respective ends of said connecting-bar having concaved inner faces to receive the inner ends of said end bars, an elongated central eye to receive the pole-supporting socket, inwardly-extending pivot-pins and, at one edge, inwardly-extending lugs, and a pole-supporting socket having pivotal bearing on said pivot-pins and having in one edge upper and lower recesses to receive the lugs extending inwardly from the eyed portion of said connecting-bar, substantially as and for the purpose set forth.

2. A neck-yoke consisting of a pair of end bars having shouldered inner ends, a metallic connecting-bar having concaved inner faces adapted to fit the upper and under faces of the shouldered inner ends of said end bars and an elongated central eye, pivot-pins extending inwardly from the upper and under portions of said eye to pivotally connect the pole-receiving socket, a pole-receiving socket having thickened and recessed upper and lower portions, and lugs or projections extending inwardly from said central eye and of less width than and connecting with the recesses in said pole-receiving socket for the purpose of limiting the oscillation of said socket, substantially as set forth.

In testimony whereof I affix my signature in presence of two witnesses.

WILLIAM JOHNSTON.

Witnesses:
ORIN LORD,
A. G. FOSS.